United States Patent
Izumi et al.

(10) Patent No.: US 7,307,397 B2
(45) Date of Patent: Dec. 11, 2007

(54) DRIVING UNIT

(75) Inventors: Tomohiro Izumi, Osaka (JP); Yasuo Ibuki, Hikone (JP); Mikihiro Yamashita, Echi-gun (JP); Hideaki Abe, Neyagawa (JP)

(73) Assignee: Matsushita Electric Works, Ltd., Osaka (JP)

( * ) Notice: Subject to any disclaimer, the term of this patent is extended or adjusted under 35 U.S.C. 154(b) by 14 days.

(21) Appl. No.: 11/150,284

(22) Filed: Jun. 13, 2005

(65) Prior Publication Data

US 2005/0275294 A1     Dec. 15, 2005

(30) Foreign Application Priority Data

Jun. 14, 2004   (JP)   .............................. 2004-176156

(51) Int. Cl.
*G05B 11/01*   (2006.01)

(52) U.S. Cl. ...................... 318/560; 318/119; 318/432; 318/599; 318/811; 361/152; 361/154

(58) Field of Classification Search ................ 318/560, 318/3, 9, 119, 432, 434, 459, 500, 599, 811; 361/152, 154
See application file for complete search history.

(56) References Cited

U.S. PATENT DOCUMENTS

| | | | |
|---|---|---|---|
| 5,621,603 A * | 4/1997 | Adamec et al. | 361/154 |
| 5,673,165 A * | 9/1997 | Kuhn et al. | 361/154 |
| 6,133,701 A * | 10/2000 | Gokturk et al. | 318/114 |
| 6,819,209 B2 * | 11/2004 | Yajima et al. | 335/257 |
| 2001/0008355 A1 | 7/2001 | Gökturk et al. | |
| 2004/0108824 A1* | 6/2004 | Ueda et al. | 318/114 |
| 2005/0127759 A1 | 6/2005 | Kraus et al. | |

FOREIGN PATENT DOCUMENTS

| | | |
|---|---|---|
| DE | 102 25 024 A1 | 12/2003 |
| EP | 0 952 663 A2 | 10/1999 |
| EP | 1 117 176 A2 | 7/2001 |
| JP | 2000-014190 A | 1/2000 |
| JP | 3382061 B2 | 12/2002 |

\* cited by examiner

*Primary Examiner*—Rina Duda
(74) *Attorney, Agent, or Firm*—Rader, Fishman & Grauer PLLC

(57) ABSTRACT

A driving unit of the present invention comprises a moving element, an elastic body configured to support the moving element, a permanent magnet fixed on said moving element, an electromagnet disposed to be opposed to said permanent magnet, and a controller. The moving element and the elastic body constitute a resonance system. The electromagnet includes a magnetic material and a coil wounded around the magnetic material. The controller magnetizes the magnetic material by feeding a current through the coil and gives a vibration force to the moving element by magnetic force acting between the magnetic material and the permanent magnet. The feature of the present invention resides in that the controller determines a current waveform necessary for an intended motion of the moving element, and applies a voltage to the coil intermittently so that a current in the form of the current waveform flows through said coil.

11 Claims, 15 Drawing Sheets

DRIVING UNIT

TECHNICAL FIELD

The present invention relates to a driving unit and a method for driving a resonance system comprising an elastic body and a moving element supported by the elastic body.

BACKGROUND ART

Japanese Patent Publication No. 3382061 discloses a driving unit for driving a resonance system comprising an elastic body and a moving element supported by the elastic body. The driving unit is used in an electric shaver as a linear actuator which reciprocates an inner cutter.

The driving unit is energy efficient because the moving element reciprocates as the resonance system conserves kinetic energy of the moving element and elastic energy of the elastic body and converts them to each other alternately. In actuality, since the energy is consumed by a load and so on, the driving unit has to give consumed energy to the moving element in order to keep the reciprocating motion.

So, in this driving unit, as shown in FIG. 24, a controller of the driving unit gives an alternating voltage of a rectangular wave to an electromagnet every half-cycle, and reciprocates the moving element with a constant amplitude by controlling an voltage application period (Ton) and a phase (Tph) of the alternating voltage.

Explaining in more detail, when the rectangular voltage is applied to the electromagnet, a current in the form of a triangular wave, as shown in FIG. 24, flows through a coil of the electromagnet. Vibration force which moves the moving element will increase or decrease in response to the amount of the current flowing through the coil. For example, when the amount of the current flowing through the coil increases as shown by a dashed line in FIG. 24, the vibration force will increase, and, on the other hand, when the amount of the current flowing through the coil decreases, the vibration force will decrease. So, in this driving unit, the controller detects a motion of the moving element every half-cycle, and if the width of the moving element is larger than a target width, the controller decreases the voltage application period, and if the width of the moving element is shorter than the target width, the controller increases the voltage application period. Furthermore, the controller applies the voltage to the coil when the moving element goes a predetermined phase (Tph) from a top dead center or a bottom dead center so as to apply the voltage at the right time in keeping with the moving direction of the moving element.

As mentioned above, the conventional driving unit controls the moving unit by varying the voltage application period (Ton) and the phase (Tph) of the voltage in order to make the moving element do an intended motion, such as a reciprocating motion with constant amplitude. However, although the conventional control method can make the moving element do an intended motion, it does not take into consideration an influence of a waveform of the current flowing through the coil on energy efficiency. Therefore, in the conventional driving unit, a current in the form of the triangular wave having many harmonic components flows through the coil, as mentioned above, so that a momentary current becomes very high at the conclusion of the energization. As a result, an energy loss due to resistances of the coil, control circuit, etc. increases, by which heating values of electronic components and coil increase, and total energy efficiency decreases.

DISCLOSURE OF THE INVENTION

In view of the above problem, the object of the present invention is to provide a driving unit and a method for driving a resonance system which can improve energy efficiency.

The driving unit in accordance with the present invention comprises a moving element, an elastic body configured to support the moving element, a permanent magnet fixed on said moving element, an electromagnet disposed to be opposed to said permanent magnet, and a controller. The moving element and the elastic body constitute a resonance system in which kinetic energy of the moving element and elastic energy of the elastic body are conserved and converted to each other. The electromagnet includes a magnetic material and a coil wounded around the magnetic material. The controller magnetizes the magnetic material by feeding a current through the coil, and gives a vibration force to the moving element by magnetic force acting between the magnetic material and the permanent magnet. The feature of the present invention resides in that the controller determines a current waveform necessary for an intended motion of the moving element, and applies a voltage to the coil intermittently so that a current in the form of the current waveform flows through said coil. Therefore, an electric current in the form of a current waveform desirable for an intended motion of the moving element can flow through the coil, so that an energy loss due to an unnecessary current can be reduced and the energy efficiency can be improved.

Preferably, the controller determines a shape and a phase of the current waveform necessary for the intended motion of the moving element. Or, it is also preferable that the controller determines a shape and an application time of the current waveform. The driving unit can be driven more efficiently by controlling the phase and the application time of the current waveform in addition to controlling the shape of it.

A desirable current waveform for the intended motion of the moving element varies depending on various factors, such as a state of the resonance system and an external load. Therefore, it is preferable that the driving unit further comprises a sensor configured to detect a behavior of the moving element, and the controller determines the current waveform in response to the behavior of the moving element detected by the sensor. In this case, an optimal current waveform can be determined in response to the behavior of the moving element.

In a driving unit for driving such resonance system, it is most energy efficient when the moving element reciprocates under a resonant condition where the reciprocating motion of the moving element is synchronous with a natural frequency determined by a mass of the moving element and an elasticity of the elastic body. Therefore, it is preferable that the controller determines the current waveform necessary for the moving element to reciprocate in a resonant condition.

In order to form an intended current waveform precisely, it is preferable that the controller predicts induced electromotive force generated with the reciprocating motion of the moving element, and forms the current waveform using the induced electromotive force. And, it is also preferable that the controller predicts inductance or a change of the inductance which varies by a position of the moving element or a change of the position of the moving element 1, and forms the current waveform while taking into consideration the inductance or the change of the inductance. Furthermore, it is also preferable that the controller changes the current waveform in response to a change of a power supply voltage.

In order to apply the voltage to the coil intermittently, it is preferable that the controller controls ON-time and OFF-time of the voltage to be applied to the coil. Or, it is also preferable that the controller controls a ratio of ON-time to OFF-time of the voltage to be applied to the coil. Or, the controller may control a sum of ON-time and OFF-time of the voltage to be applied to the coil. Or, the controller may control a sum of ON-time and OFF-time of the voltage to be applied to the coil and a ratio of the ON-time to the OFF-time of the voltage. In these cases, the controller can form various shapes of the current waveforms, so that an intended current waveform can flow through the coil.

BEST MODE FOR CARRYING OUT THE INVENTION

Hereinafter, the present invention will be described in more detail with reference to the accompanying drawings.

Figure 1A:
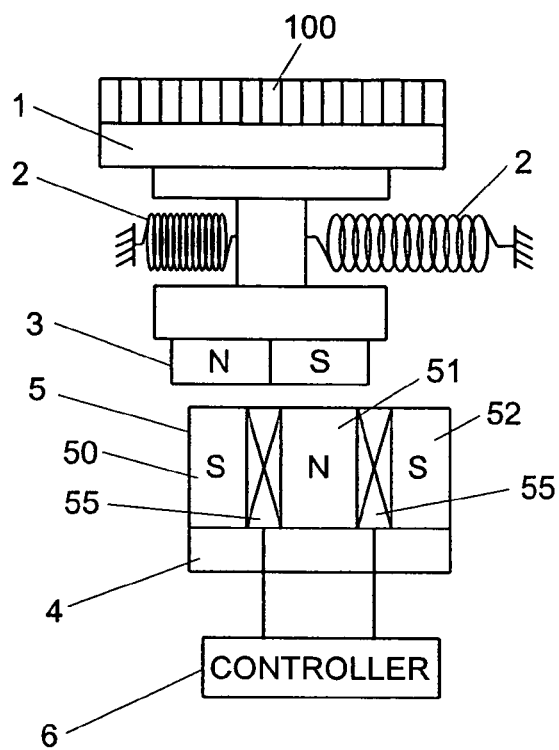
FIGS. 1A and 1B are views showing a construction of a driving unit in accordance with an embodiment of the present invention.
Figure 1B:
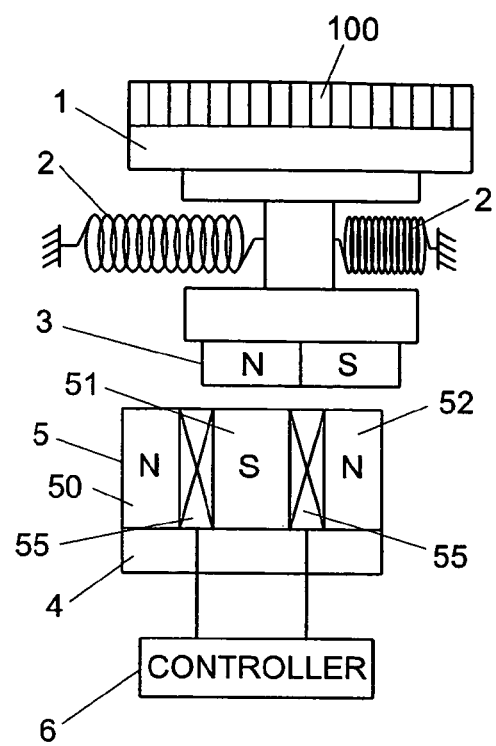

FIG. 1A shows a driving unit for driving a resonance system in accordance with an embodiment of the present invention. The driving unit is used in an electric shaver as a linear actuator for reciprocating an inner cutter 100 fixed on a moving element 1. As shown in FIG. 1A, the driving unit comprises a moving element 1 both sides of which are supported by coil springs 2 as elastic bodies, a permanent magnet 3 fixed on the moving element 1, an electromagnet 5 fixed on a stationary element 4 opposite to the permanent magnet 3, and a controller 6 which drives the moving element 1 by energizing the electromagnet 5. One end of each coil spring 2 is connected to the moving element 1, and the other end of it is fixed on a wall of a case. The moving element 1 can reciprocate in a horizontal direction, and the coil springs 2 give the moving element 1 force which makes the moving element 1 return to the center of a moving range. The electromagnet 5 comprises three magnetic materials 50 to 52 spaced uniformly, and coils 55 wound between the magnetic materials. When the coils 55 are energized, the magnetic material 51 located at the center and the magnetic materials 50, 52 located at both ends are magnetized into opposite poles. The permanent magnet 3 has a north pole and a south pole along the moving direction of the moving element 1, and the distance between the centers of the north pole and the south pole is nearly equal to the distance between the centers of the adjacent magnetic materials. The controller 6 gives an alternating voltage to the coils 55. When a positive voltage is given to the coils 55 by the controller 6, the magnetic material 51 located at the center is magnetized into a north pole and the magnetic materials 50, 52 located at both ends are magnetized into a south pole, respectively, as shown in FIG. 1A, and the moving element 1 is moved to the left in FIG. 1A by magnetic forth acting between the magnetic materials 50, 51 and the permanent magnet 3. On the other hand, when a negative voltage is given to the coils 55, the magnetic material 51 located at the center is magnetized into a south pole and the magnetic materials 50, 52 located at both ends are magnetized into a north pole, respectively, as shown in FIG. 1B, and the moving element 1 is moved to the right in FIG. 1B by a magnetic forth between the magnetic materials 51, 52 and the permanent magnet 3. While the coils 55 are not energized, the moving element 1 is located at the center of the moving range by the force of the coil springs 2. The resonance system comprising the elastic body (the coil spring 2) and the moving element 1 supported by the elastic body like this is energy efficient because the moving element 1 reciprocates while conserving kinetic energy of the moving element and elastic energy of the elastic body and converting them to each other alternately.

Figure 2:
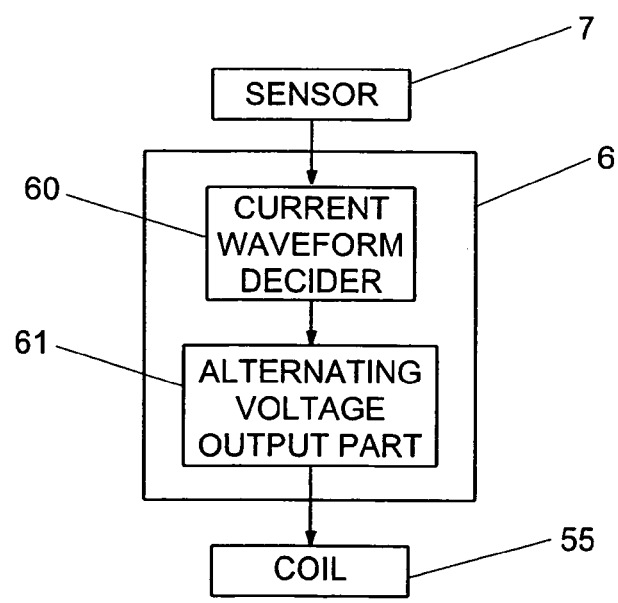
FIG. 2 is a block diagram of a controller of the driving unit.

FIG. 2 is a block diagram of the controller 6. The controller 6 is electrically connected to a sensor 7 for detecting a behavior of the moving element 1, and comprises a current waveform decider 60 which determines a current waveform necessary for an intended motion of the moving element 1 in response to the behavior of the moving element 1 detected by the sensor 7, and an alternating voltage output part 61 which applies a voltage to the coil 55 intermittently based on a control signal from the current waveform decider 60 so that a current in the form of the current waveform determined by the current waveform decider 60 will flow through the coil 55.

The sensor 7 detects a behavior of the moving element 1, such as amplitude, velocity, acceleration, vibration force, frequency, and a moving direction, and gives the detected information to the current waveform decider 60.

Figure 3A:
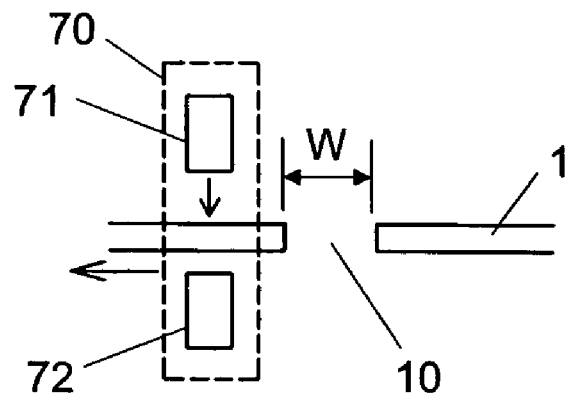
FIGS. 3A to 3C are views showing an example of a sensor for detecting a behavior of a moving element of the driving unit.
Figure 3B:
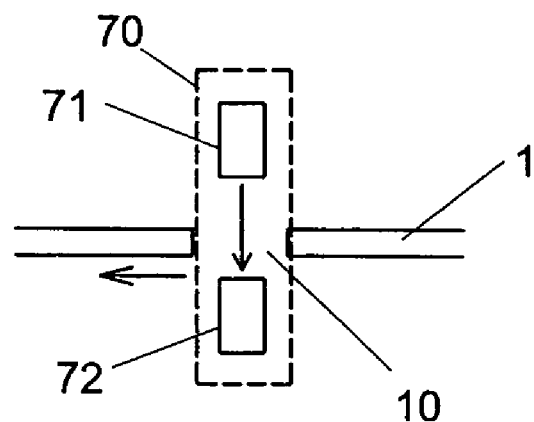
Figure 3C:
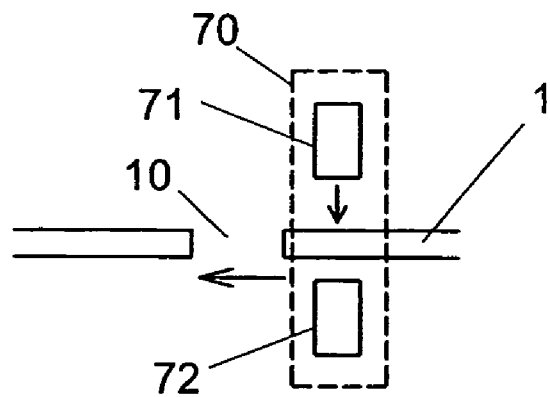
Figure 4:
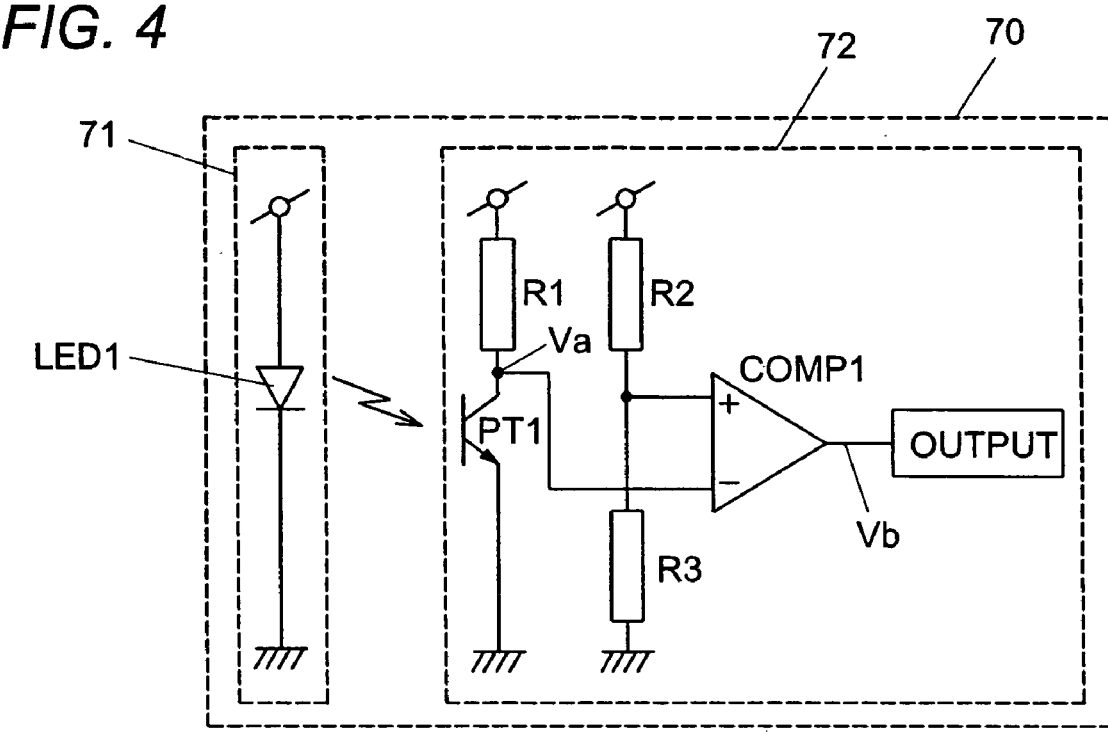
FIG. 4 is a view showing a circuit configuration of the sensor of FIGS. 3A to 3C.
Figure 5:
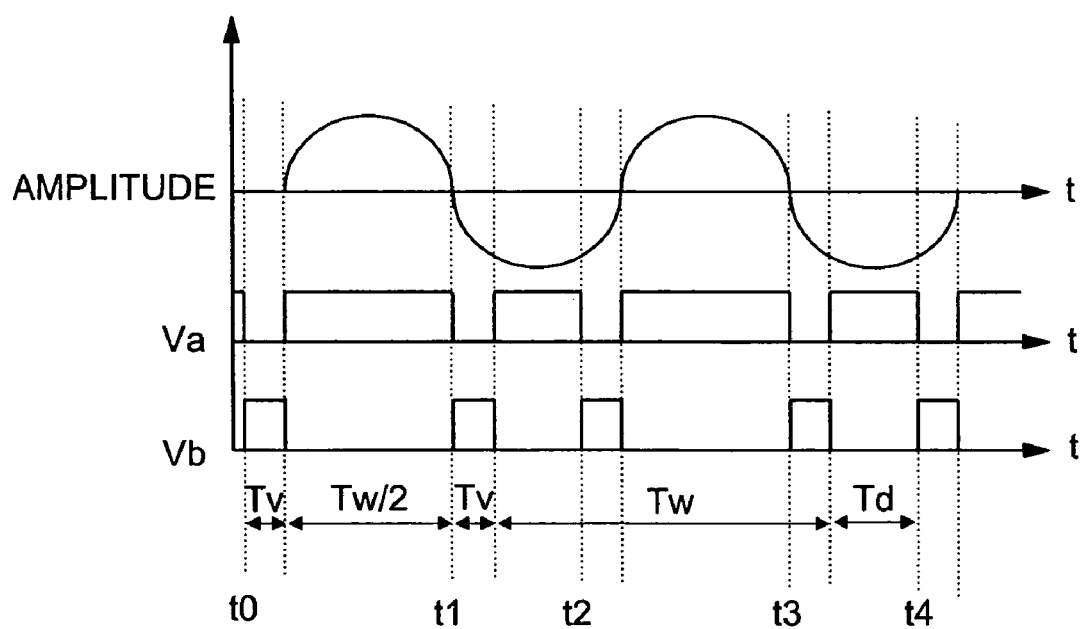
FIG. 5 is a time chart showing an output of the circuit of FIG. 4.

FIGS. 3A to 3C show one example of the sensor 7. This sensor 7 is a photo sensor 70 comprising a light emitting element 71 and a light receiving element 72. In this case, the moving element 1 has a slit 10 having a width W, and the light emitting element 71 and the light receiving element 72 are disposed on both sides of the slit 10. As shown in FIG. 4, the light emitting element 71 is constituted by a LED1, and the light receiving element 72 is constituted by a series circuit of a resistance R1 and a phototransistor PT1, a series circuit of resistances R2 and R3, and a comparator (COMP1) whose inverting input terminal is connected to a connection point between the resistance R1 and a collector of the phototransistor PT1 as well as whose noninverting input terminal is connected to a connection point between the resistance R2 and the resistance R3. As shown in FIG. 3A, while the light emitted from the light emitting element 71 is intercepted by the moving element 1, the voltage (Va) of the collector of the phototransistor PT1 becomes high, as shown in FIG. 5, and then the output (Vb) of the comparator (COMP1) becomes low. And as shown in FIG. 3B, when the moving element 1 begins to move from one side toward the center position and gets to the center position (amplitude=0) (see at time t1, t3 in FIG. 5), the light receiving element 72 begins to receive the light emitted from the light emitting element 71 through the slit 10. While the light receiving element 72 receives the light through the slit 10 (see a period (Tv) in FIG. 5), the voltage (Va) of the collector is held at low level, so the output (Vb) of the comparator (COMP1) is held at high level. When the slit 10 passed through the photo sensor as shown in FIG. 3C, the light emitted from the light emitting element 71 is intercepted by the moving element 1, and the voltage (Va) of the collector becomes high, and the output (Vb) of the comparator (COMP1) becomes low (see a period (Td) in FIG. 5). On the other hand, when the moving element 1 begins to move from the other side toward the center position, the light receiving element 72 begins to receive the light emitted from the light emitting element 71 through the slit 10 before the moving element 1 reaches the center position (at time t0, t2, and t4 in FIG. 5), and the light receiving element 72 keeps receiving the light until the slit 10 passes the photo sensor. While the light receiving element 72 receives the light (a period Tv in FIG. 5), the voltage (Va) of the collector is held at low level, and the output (Vb) of the comparator (COMP1) is held at high level. When the slit 10 passed through the photo sensor, the light emitted from the light emitting element 71 is intercepted by the moving element 1, and the voltage (Va) of the collector becomes high, and the output (vibe) of the comparator (COMP1) becomes low over a half period (a period Tw/2 in FIG. 5). By such an output from the comparator (COMP1), the behavior of the moving element 1, such as a position, a frequency (1/Tw), a velocity of a specific segment (W/Tv), and a moving direction of the moving element 1, can be detected (The moving direction can be detected by a comparison of the lengths of the periods Tw/2 and Td).

The current waveform decider 60 calculates an optimal current waveform for an intended motion of the moving element 1 in response to the behavior of the moving element 1 detected by the sensor 7. For example, the current waveform decider 60 calculates an optimal current waveform for a reciprocating motion of the moving element 1 with constant amplitude under a resonance condition. The driving unit for an electric shaver is required to keep a constant amplitude regardless of any external load, and, in the resonance system like this, it is most energy efficient when the moving element reciprocates under the resonant condition where the reciprocating motion of the moving element is synchronous with a natural frequency determined by a mass of the moving element and an elasticity of the elastic body. Therefore, it is preferable that the current waveform decider 60 calculates an optimal current waveform for the reciprocating motion of the moving element 1 with constant amplitude under a resonance condition. It should be noted that, because the vibration force of the moving element 1 is decided by magnetic force generated in response to an instantaneous value of the current waveform, determining the current waveform necessary for an intended motion of the moving element 1 means determining a vibration force necessary for an intended motion of the moving element 1. Put another way, the current waveform decider 60 calculates an optimal vibration force necessary for an intended motion of the moving element 1 to drive the moving element 1 efficiently.

The current waveform that the current waveform decider 6 determines includes a phase and an application time of the current waveform as well as a shape of the current waveform. That is, the current waveform decider 60 calculates the phase and the application time of the current waveform as well as the shape of the current waveform. In a control method for the resonance system, the moving element 1 can be driven efficiently if the coil is energized after a lapse of a certain period (Tph) from an inversion of the moving direction of the moving element 1. Furthermore, it is important for the control method for a resonance system to give a current to the coil within a half-period of the moving element so that the vibration force will not become brake force. Therefore, the current waveform decider 60 decides the phase of the current waveform, that is, the time period (Tph) in FIG. 6, and an application time of the current waveform, that is, the time period (Ton) in FIG. 6, as well as a shape of the current waveform, in response to the behavior of the moving element 1 detected by the sensor 7 in order to make the moving element 1 do an intended motion efficiently. The moving element 1 can be driven more efficiently by controlling the phase and the application time of the current waveform in addition to controlling the shape of the current waveform.

Figure 6:
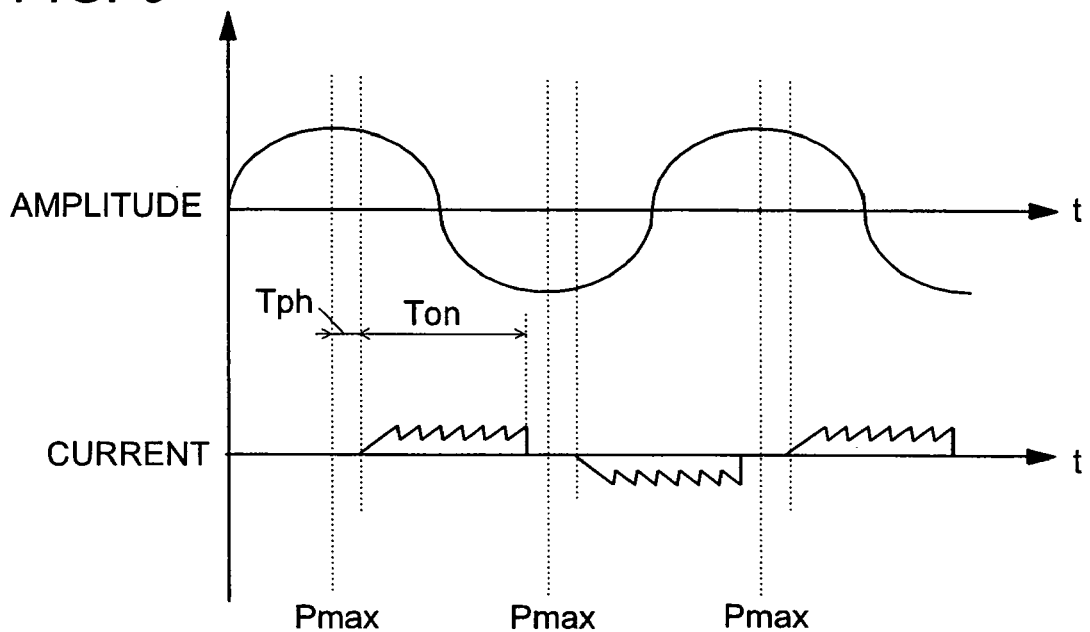
FIG. 6 is a view showing an example of a current waveform determined by a current waveform decider.

FIG. 6 shows one example of the current waveform determined by the current waveform decider 60. The current waveform of FIG. 6 is a sawtooth current waveform whose peak is kept low. The current waveform is applied to the coil during a certain application time (Ton) after a lapse of a certain period (Tph) from time point when the moving element 1 passed the maximum amplitude point (Pmax). A value of the current and the length of time periods (Tph), (Ton) are controlled appropriately in response to the behavior of the moving element 1.

Figure 7A:
FIGS. 7A to 7E are views showing other examples of the current waveform.
Figure 7B:
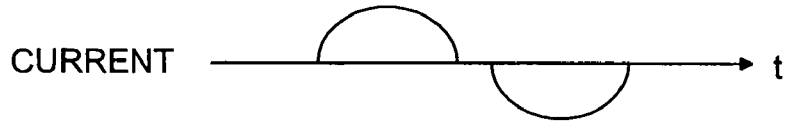
Figure 7C:
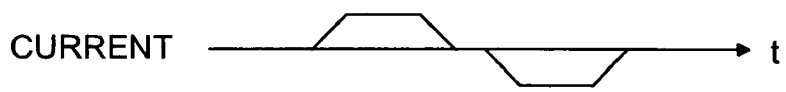
Figure 7D:
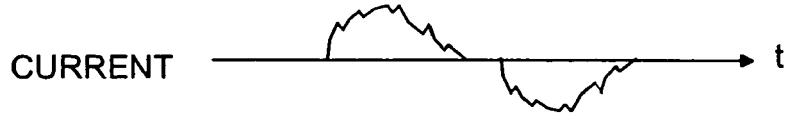
Figure 7E:
Figure 8:
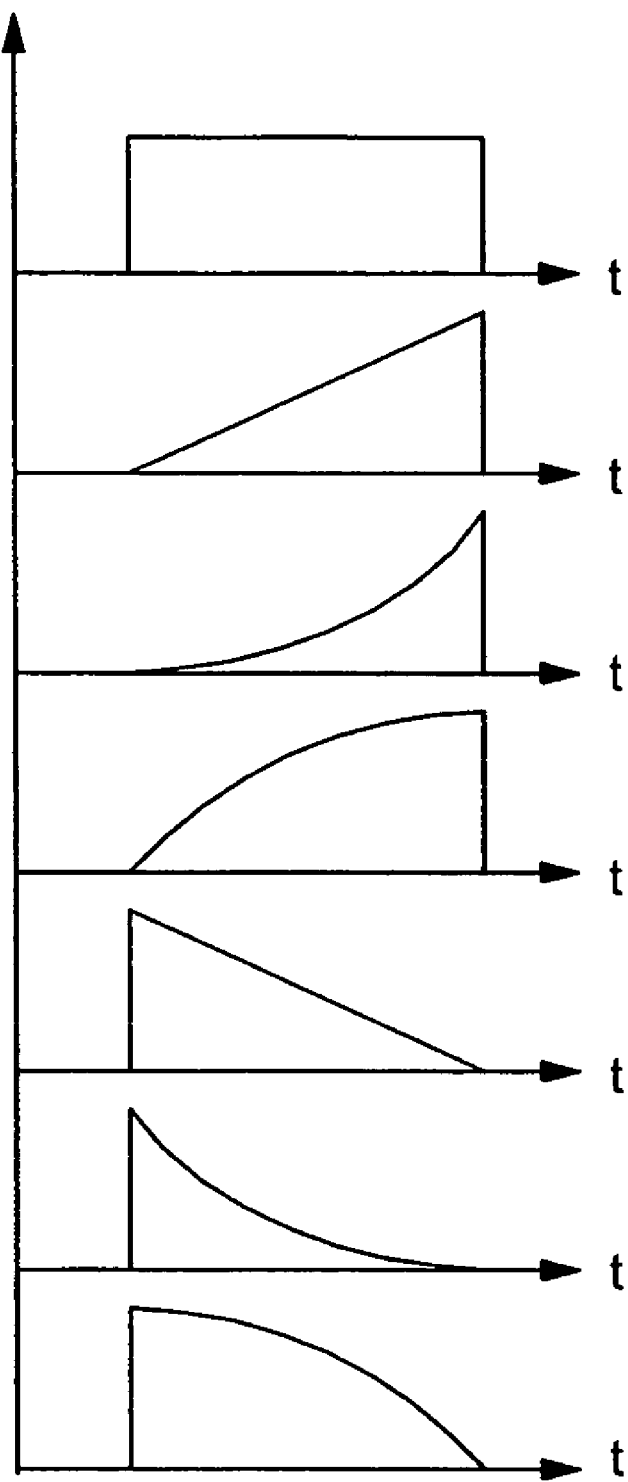
FIG. 8 is a view showing fundamental waveforms.

Of course, the shape of the current waveform is not limited to the sawtooth current waveform shown in FIG. 6. Since an optimal current waveform for giving vibration force to a resonance system differs depending on a structure of the resonance system or a load, the current waveform decider 60 determines the current waveform according to the structure of the resonance system, the load, the behavior of the moving element 1 and so on. Other examples of the current waveform are shown in FIGS. 7A to 7E. The current waveform shown in FIG. 7A is in the form of an isosceles triangle, the current waveform shown in FIG. 7B is in the form of a half cycle, the current waveform shown in FIG. 7C is in the form of a trapezoid, the current waveform shown in FIG. 7D is in the form of a half cycle having ripples, and the current waveform shown in FIG. 7E is in the form of a triangle having ripples. These waveforms can be formed by a combination of the fundamentals shown in FIG. 8.

The alternating voltage output part 61 is controlled by control signals sent from the current waveform decider 60, and it applies a voltage to the coil 55 intermittently so that a current in the form of the current waveform determined by the current waveform decider 60 will flow through the coil 55.

Figure 9:
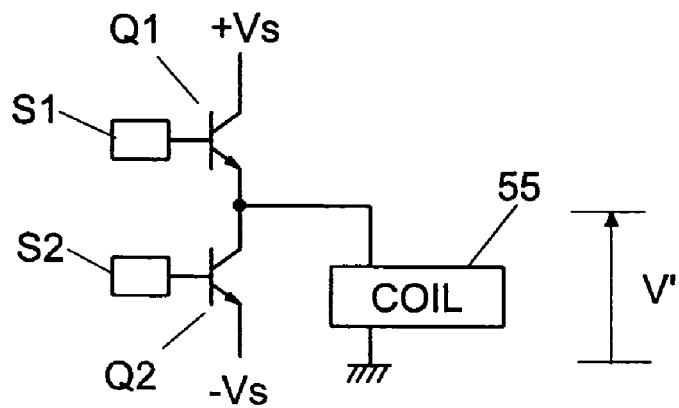
FIG. 9 is a view showing one example of a circuit configuration of an alternating voltage output part.

FIG. 9 shows one example of a circuit configuration of the alternating voltage output part 61. The alternating voltage output part 61 is constituted by a series circuit of switching elements Q1 and Q2 each of which is a NPN transistor connected between a control voltage (+Vs) and a control voltage (−Vs). The coil 55 is connected to a connection point between the switching elements Q1 and Q2 and to the ground. The switching elements Q1 and Q2 are controlled by the control signals S1, S2 which are inputted into each of the base terminals of the switching elements Q1, Q2 by the current waveform decider 60.

Figure 10:
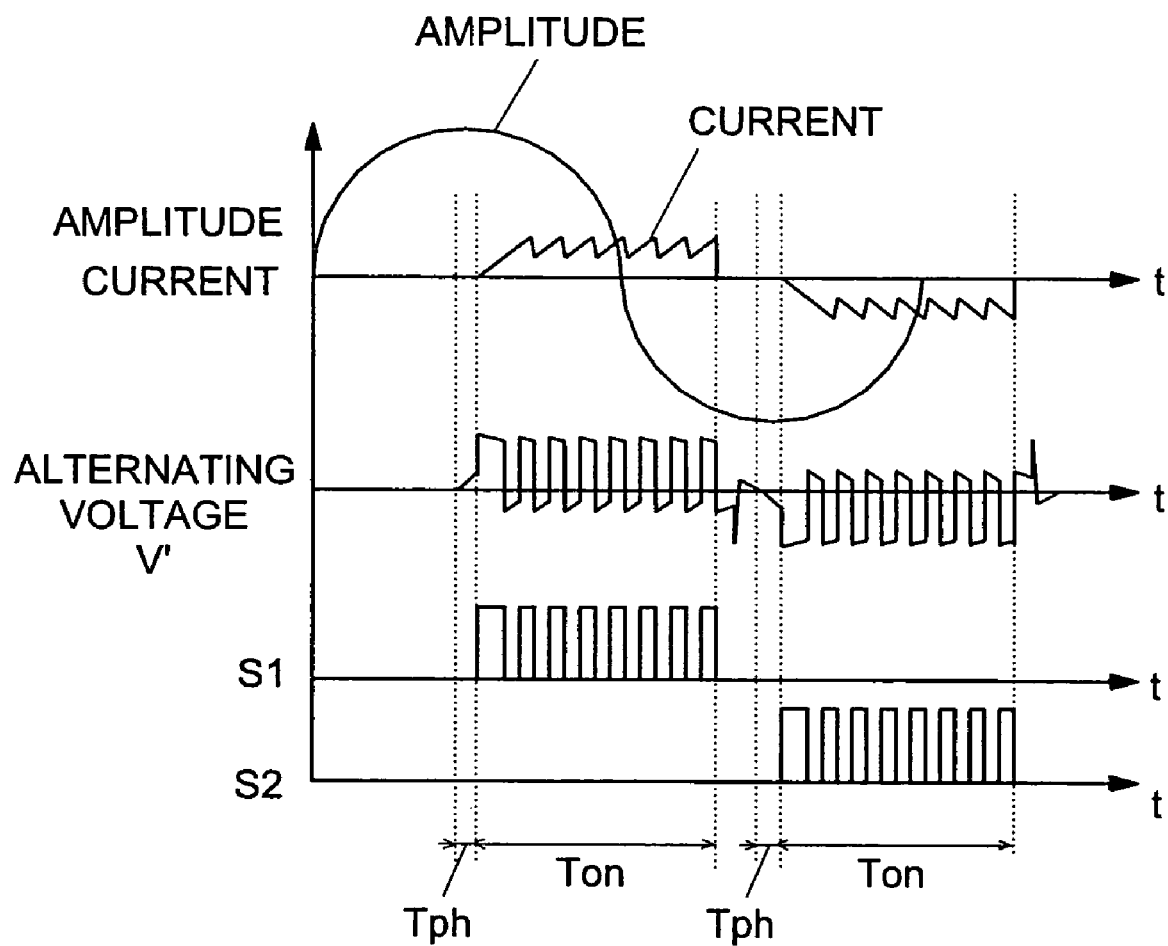
FIG. 10 is a time chart of the control signals.
Figure 11A:
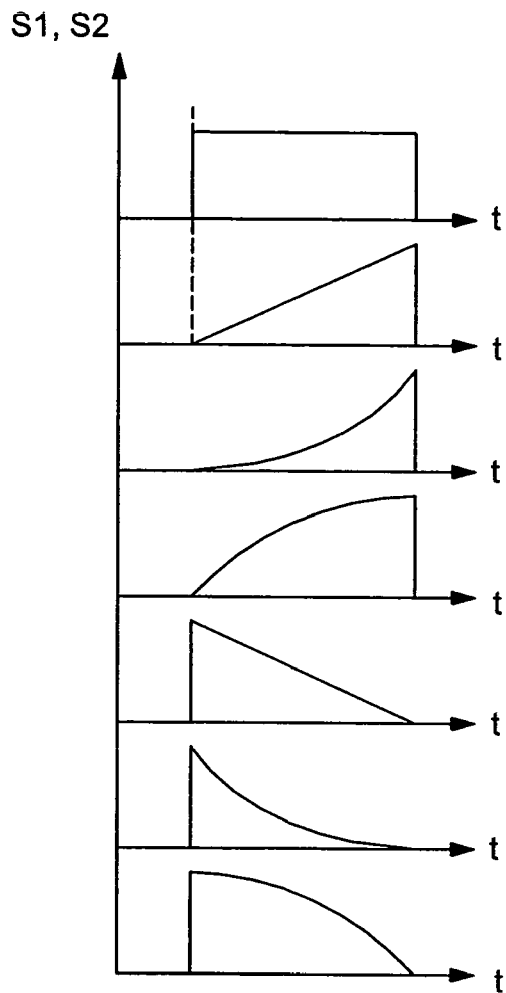
FIGS. 11A and 11B are views showing examples of the control signal.
Figure 11B:
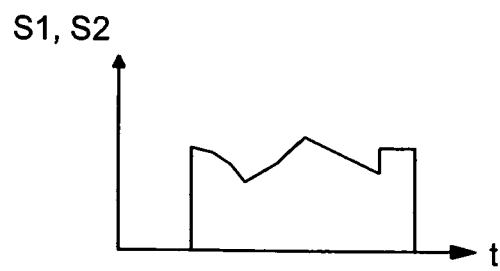

FIG. 10 shows a time chart of the control signals S1, S2 for forming the sawtooth current waveform shown in FIG. 6. As shown in FIG. 10, the control signals S1, S2 are inputted into the switching elements Q1 and Q2 intermittently, so that the voltage is applied to the coil 55 intermittently during the application time (Ton). As a result, the intended current waveform, namely the sawtooth current waveform, can flow through the coil 55. The control signal may be a shape shown in FIG. 11A, or may be a complex waveshape of the shapes of FIG. 11A, as shown in FIG. 11B.

Figure 12:
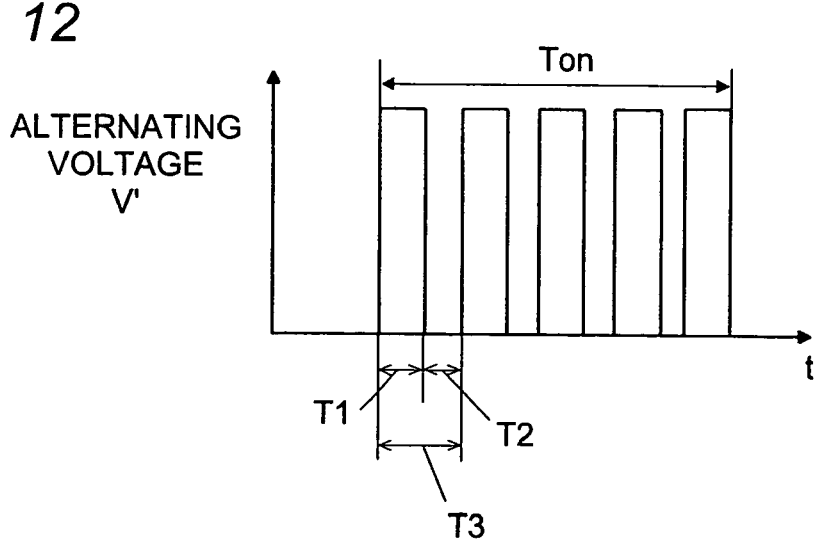
FIG. 12 is a view showing an alternating voltage.
Figure 13A:
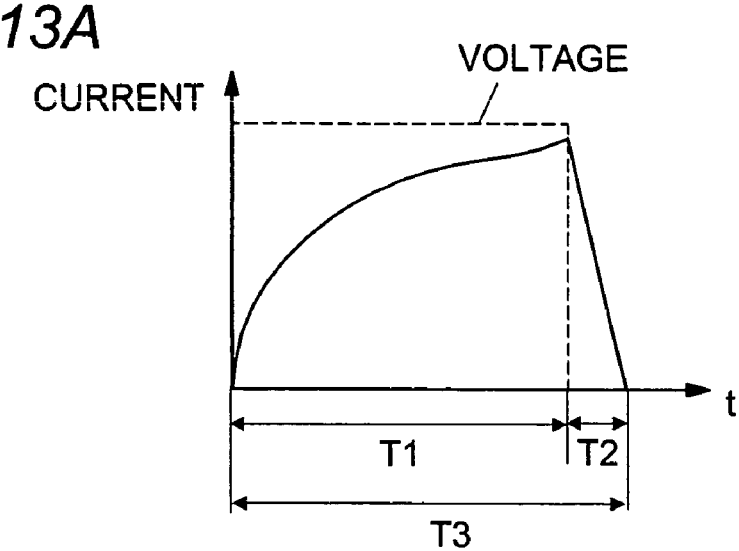
FIGS. 13A to 13C are views showing current waveforms.
Figure 13B:
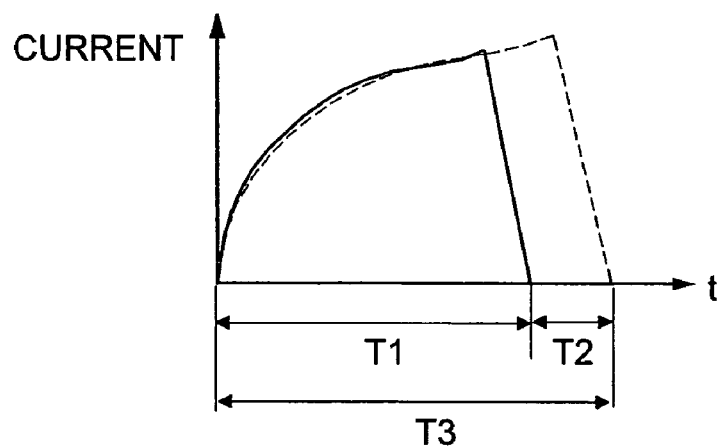
Figure 13C:
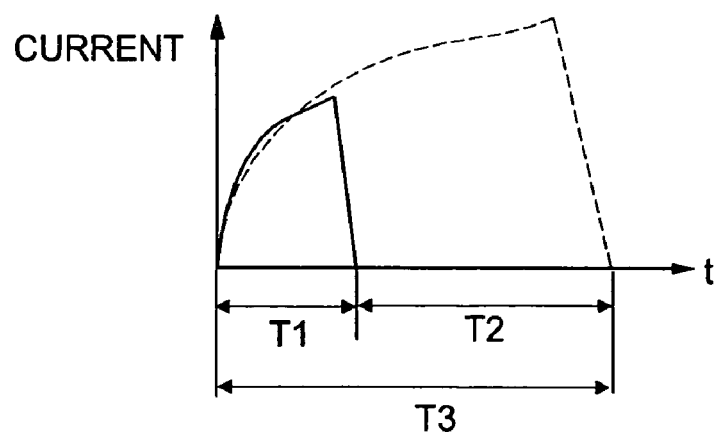
Figure 14A:
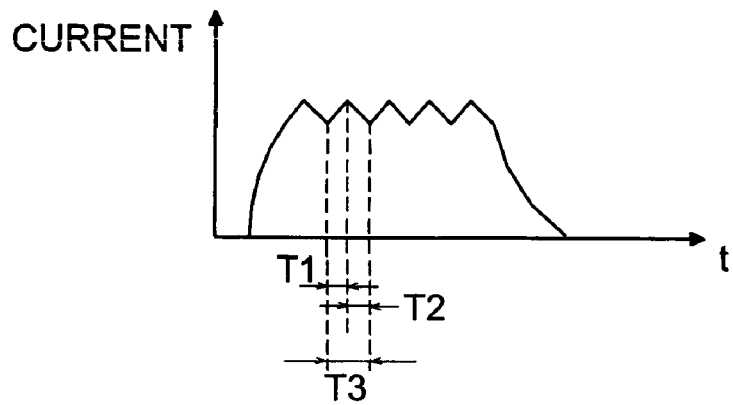
FIGS. 14A to 14C are views showing current waveforms.
Figure 14B:
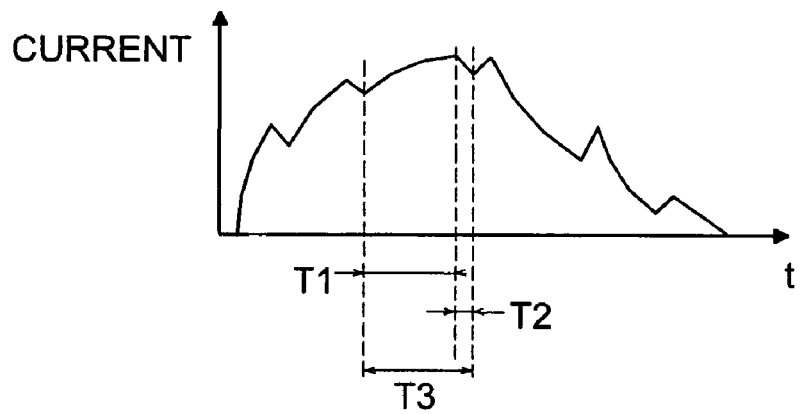
Figure 14C:
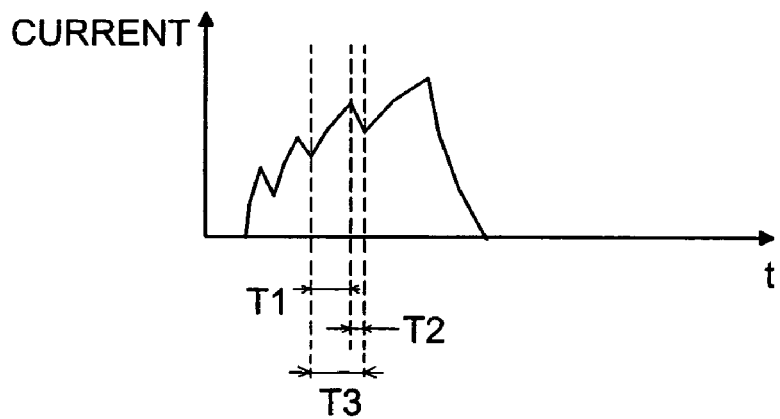

Hereinafter, the control method of the alternating voltage will be described in detail below. As shown in FIG. 12, the current waveform decider 60 controls ON-time (T1) and OFF-time (T2) of the alternating voltage to be applied to the coil 55, respectively, by the control signals S1, S2. FIGS. 13A to 131C show a current waveform at the case where the ON-time (T1) and the OFF-time (T2) are changed respectively within a certain period (T3). As shown in FIGS. 13A to 13C, the current increases during the ON-time, and decreases during the OFF-time. Therefore, the momentary current of the coil 55 can be controlled by changing the lengths of the ON-time (T1) and the OFF-time (T2), so that many kinds of the current waveforms can be formed as shown in FIGS. 14A to 14C.

In order to form the intended current waveform precisely, it is preferable that the controller 6 predicts induced electromotive force generated with the reciprocating motion of the moving element 1, and forms the current waveform using the induced electromotive force. If the induced electromotive force is not taken into consideration, the current flowing through the coil is described by the following equation:

$$i = \frac{V_1}{R}(1 - e^{-\frac{R}{L} \cdot t}) \quad (1)$$

wherein "i" represents the current, "$V_1$" represents alternating voltage, "R" represents a resistive component of a coil, "L" represents inductance, and "t" represents time.

Figure 15:
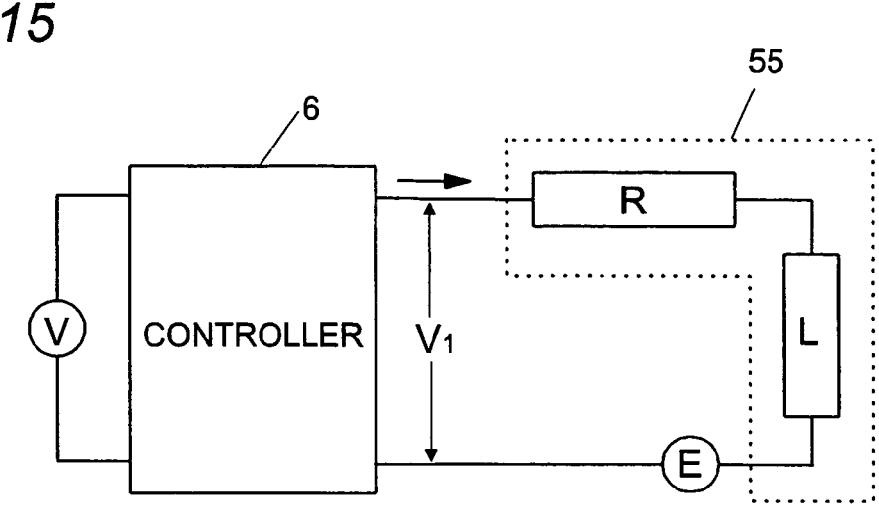
FIG. 15 is a view showing a configuration of the controller and the coil.
Figure 16:
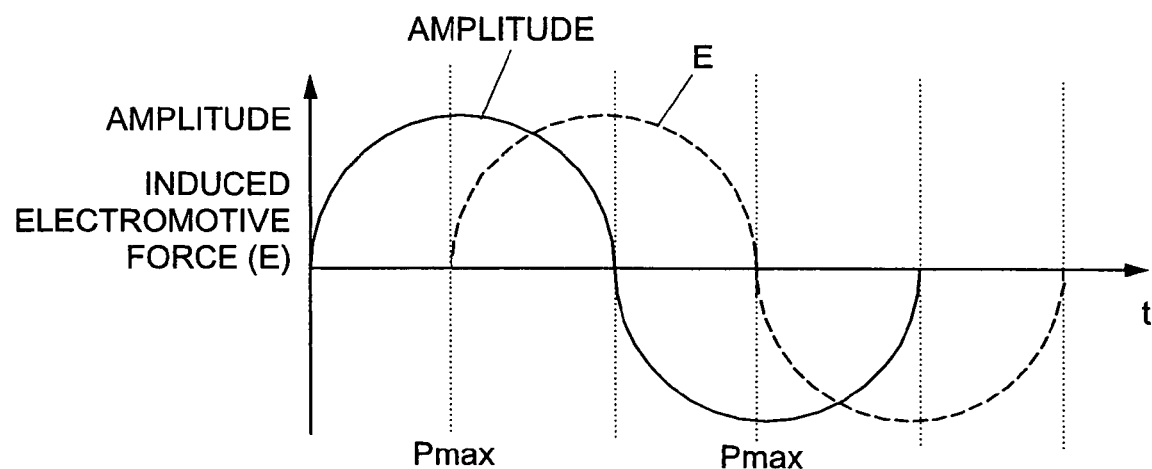
FIG. 16 is a view showing induced electromotive force.

However, in actuality, magnetic flux passing through the coil 55 varies with the movement of the permanent magnet 3 which reciprocates with the moving element 1, so that induced electromotive force E will be generated, as shown in FIG. 15 (in FIG. 15, the coil 55 is represented by a series circuit of the inductance L and the resistance R.). As the velocity of the moving element 1 increases, the induced electromotive force E increases, and the induced electromotive force peaks when the amplitude of the moving element 1 is zero, namely, the velocity of the moving element 1 reaches a maximum, as shown in FIG. 16. Therefore, when the induced electromotive force is taken into consideration, the voltage $V_2$ across the coil 55 becomes $V_2=V_1+E$ (wherein "$V_1$" is a voltage outputted from the controller 6), as shown in FIG. 17, and the current flowing through the coil is described by the following equation:

$$i = \frac{(V_1 + E)}{R}(1 - e^{-\frac{R}{L} \cdot t}) \quad (2)$$

Figure 17:
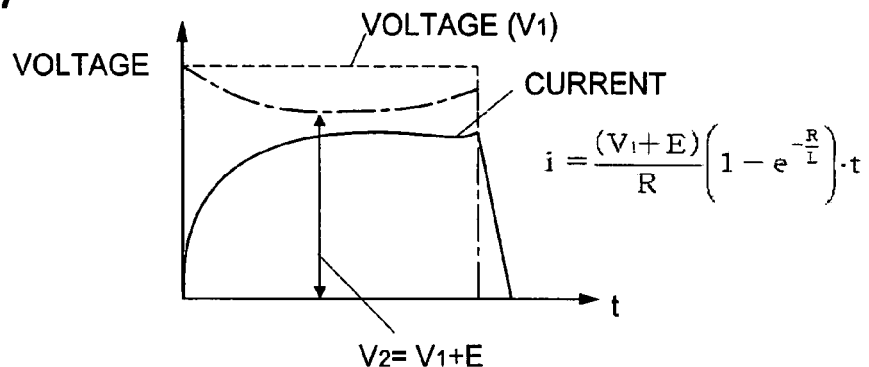
FIG. 17 is a view showing a relation between a current and a voltage.

As is clear from FIG. 17 and the above equation (2), when the induced electromotive force is taken into consideration, the current is decreased. Therefore, when the controller 6 predicts the induced electromotive force in response to the behavior of the moving element 1 and forms the current waveform using the induced electromotive force, the intended current waveform can be formed precisely.

Figure 18:
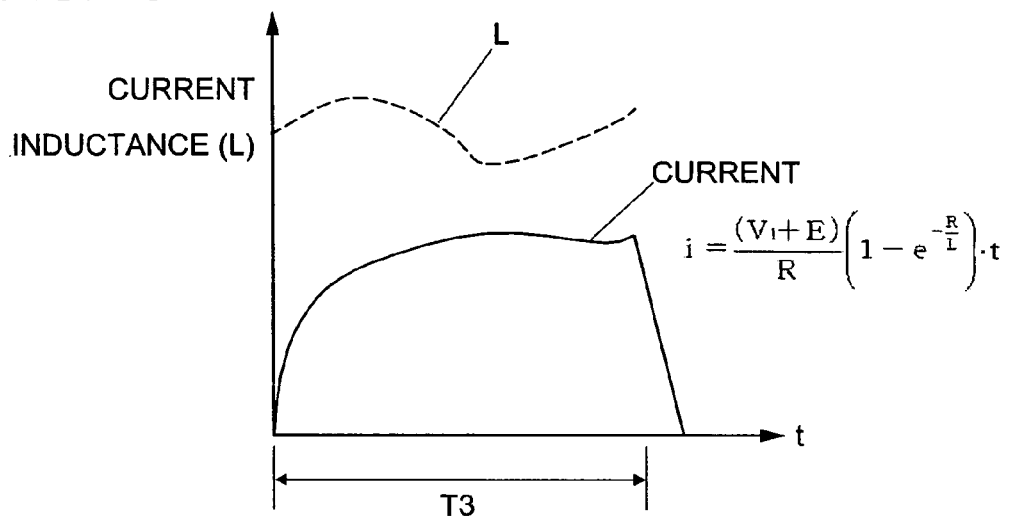
FIG. 18 is a view showing a change of inductance of the coil.

Furthermore, it is also preferable that the controller 6 predicts inductance or a change of the inductance of the coil 55 which varies in response to the position of the moving element 1, and forms the current waveform taking into consideration the inductance or the change of the inductance. FIG. 18 shows a current waveform flowing through the coil 55 and the inductance of the inductance of the coil 55 in the case where the moving element 1 moves. As shown in FIG. 18, the inductance of the coil 55 varies in response to the position of the moving element 1. Therefore, when the controller 6 predicts the inductance or the change of the inductance of the coil to form the current waveform, the controller 6 can form the intended current waveform more precisely.

Also, as is clear from the above equation (2), the current flowing through the coil 55 will increase or decrease in response to the voltage across the coil 55. Since the driving unit of this embodiment is used in the electric shaver, a battery may be used as a power source. Therefore, in order to form the current waveform precisely, it is preferable that the controller 6 changes the current waveform in response to a power supply voltage (the voltage V in FIG. 15). For example, when the power supply voltage is low, the controller 6 increases the current flowing through the coil 55, and when the power supply voltage is high, the controller 6 decreases the current. By this, the controller 6 can make the moving element 1 do an intended motion, for example a reciprocating motion with a constant amplitude, without relying on the power supply voltage.

As mentioned above, the driving unit of this embodiment can give the resonance system optimal vibration force which is neither too much nor too little for the intended motion of the resonance system by detecting the behavior of the moving element 1 by the sensor 7, and determining optimal current waveform for driving the resonance system by the current waveform decider 60 in response to the detected behavior, and outputting the momentary current necessary for the resonance system by applying the voltage to the coil intermittently. As a result, electric loss can be decreased and energy efficiency can be improved, so that the driving unit can be driven with high degrees of efficiency.

Figure 19:
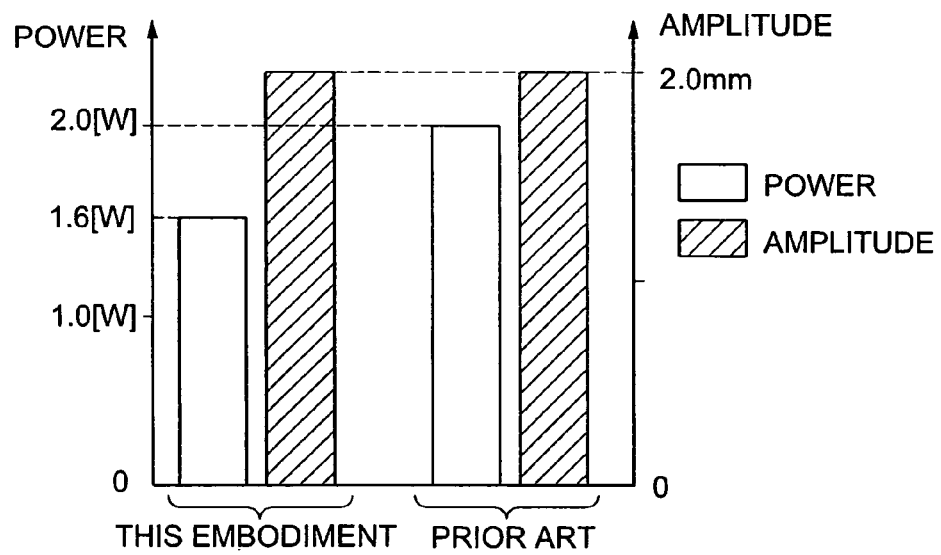
FIG. 19 is a view showing a result of an energy comparison.

FIG. 19 shows a result of an energy comparison of a case where the sawtooth current waveform shown in FIG. 6 flowed through the coil 55 and a case where the prior current waveform, namely the current in the form of the triangular wave, flowed through the coil 55. Although electricity consumption to keep amplitude of 2 mm was about 2.0 W in the case of the current in the form of the triangular wave, the electricity consumption was about 1.6 W in the case of the sawtooth current waveform. That is, the sawtooth current waveform can improve the energy efficiency about 20% against the triangular wave.

Figure 20:
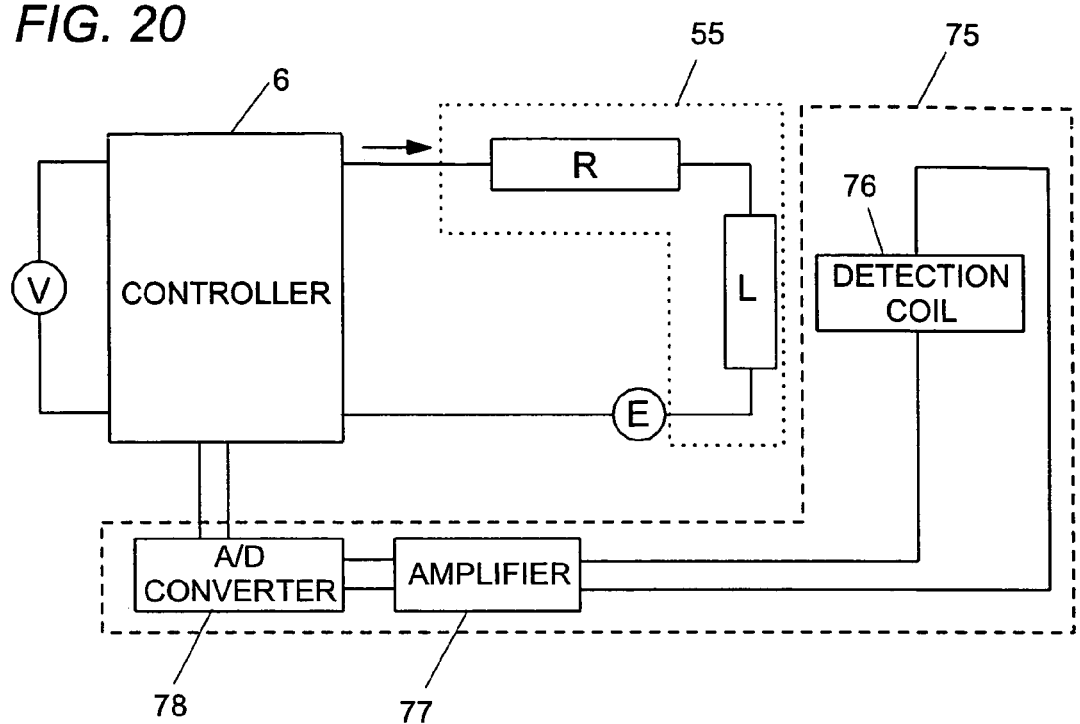
FIG. 20 is a view for explaining a sensor.
Figure 21:
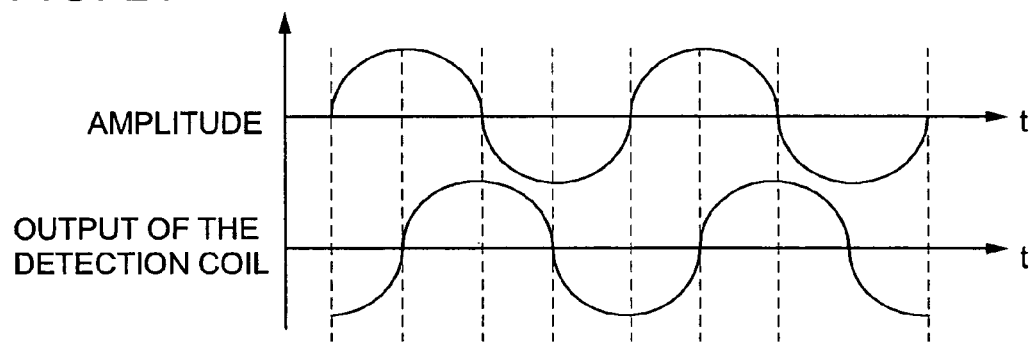
FIG. 21 is a view showing an output of the sensor of FIG. 20.

Although the sensor 7 of this embodiment was constituted by a photo sensor 70, the sensor 7 is not limited to this. FIG. 20 shows another example of the sensor 7. In FIG. 20, the coil 55 is represented by a series circuit of inductance L and resistance R. The sensor 75 comprises a detection coil 76 disposed near the center of the coil 55, an amplifier 77 for amplifying the output of the detection coil 76, and an A/D converter 78 which change the output of the amplifier 77 from analog to digital form. The magnetic flux of the permanent magnet 3 passing through the detection coil 76 varies in response to the reciprocating motion of moving element 1, and induced electromotive force responsive to the reciprocating motion of the moving element 1 will be generated across the detection coil 76. FIG. 21 shows the output of the detection coil 76. The output of the detection coil 76 is a sine wave which lags 90 degrees behind the amplitude of the moving element 1. Because the change of the magnetic flux passing through the detection coil 76 is proportional to the velocity of the moving element 1, the output of the detection coil 76 correlates with the velocity of the moving element 1. This output is transmitted to the controller 6 through the amplifier 77 and the A/D converter 78, and the controller 6 detects the behavior of the moving element 1, such as the position, the frequency, and the acceleration. A coil for driving the moving element 1, such as the coil 55, may be used as the detection coil 76.

Figure 22A:
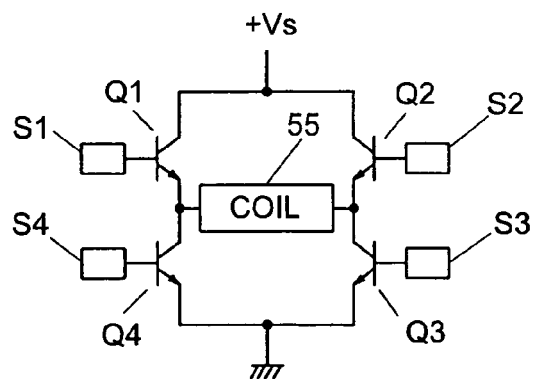
FIGS. 22A to 22E are views showing other examples of the circuit configuration of the alternating voltage output part.

In addition, the alternating voltage output part 61 may have a circuit configuration which is shown in FIGS. 22A to 22E. The alternating voltage output part 61 of FIG. 22A is constituted by a series circuit of switching elements Q1 and Q4 each of which is a NPN transistor connected between the control voltage (+Vs) and the ground, and a series circuit of switching elements Q2 and Q3 each of which is a NPN transistor connected between the control voltage (+Vs) and the ground. The coil 55 is connected between a connection point of the switching elements Q1 and Q4 and a connection point of the switching elements Q2 and Q3. The switching elements Q1 to Q4 are controlled by control signals S1 to S4, respectively, which are inputted into the base terminals by the current waveform decider 60.

Figure 22B:
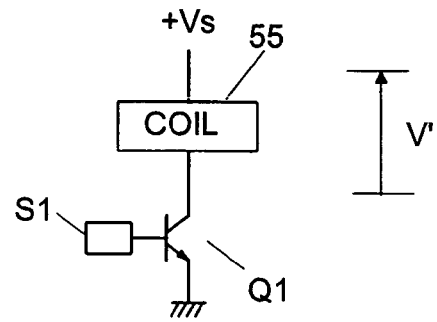
Figure 22C:
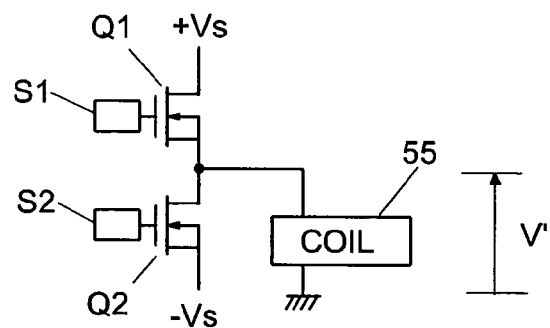

The alternating voltage output part 61 of FIG. 22B is constituted by a series circuit of the coil 55 and switching element Q1 of NPN transistor, and is connected between the control voltage (+Vs) and the ground. The switching element Q1 is controlled by control signal S1 inputted into the base terminal by the current waveform decider 60. The alternating voltage output parts 61 shown in FIGS. 22C to 22E use FETs as the switching elements Q1 to Q4 of the alternating voltage output part of FIGS. 9 and 22A to 22B.

Figure 22D:
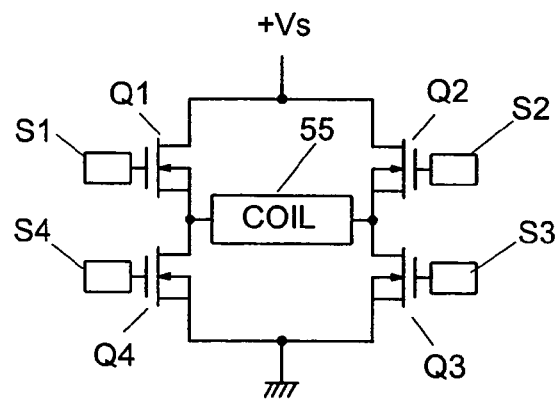
Figure 22E:
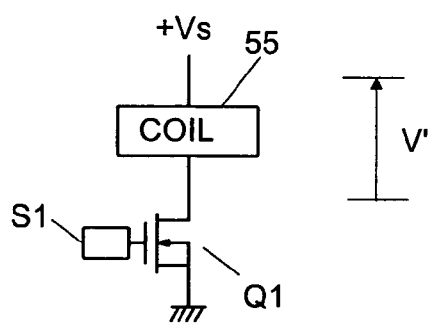
Figure 23A:
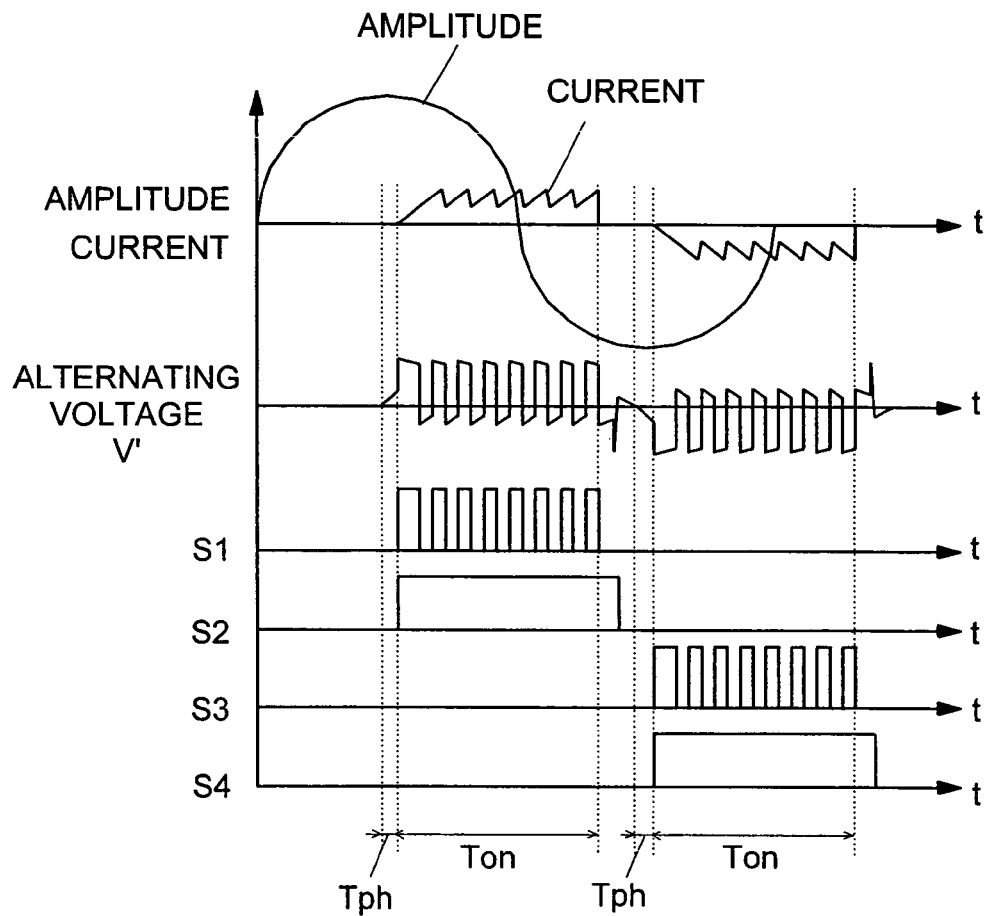
FIGS. 23A to 23B are time charts of the control signals.
Figure 23B:
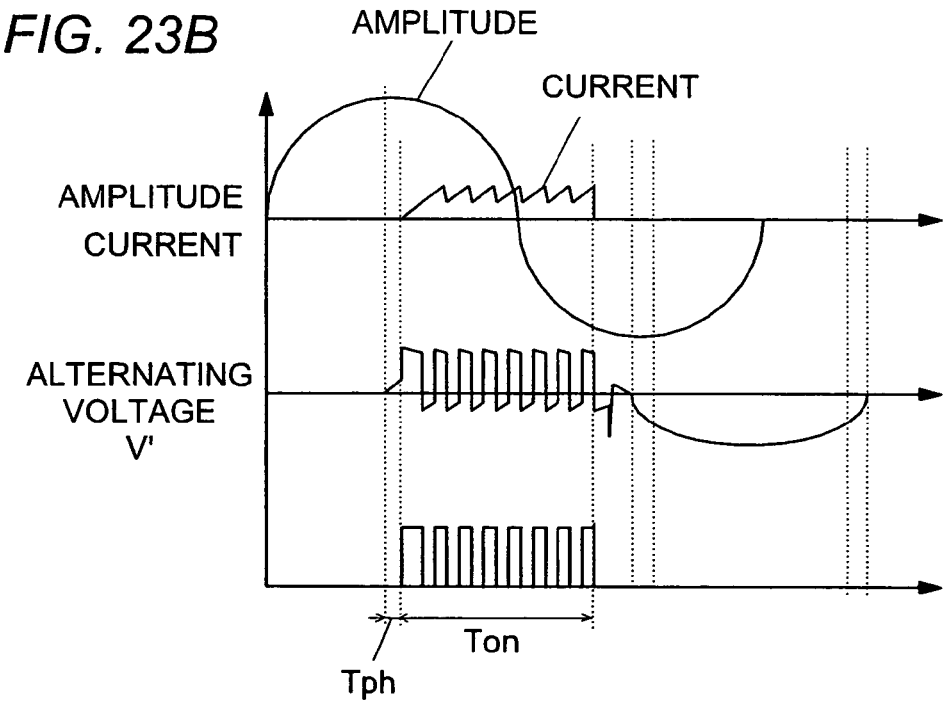
Figure 24:
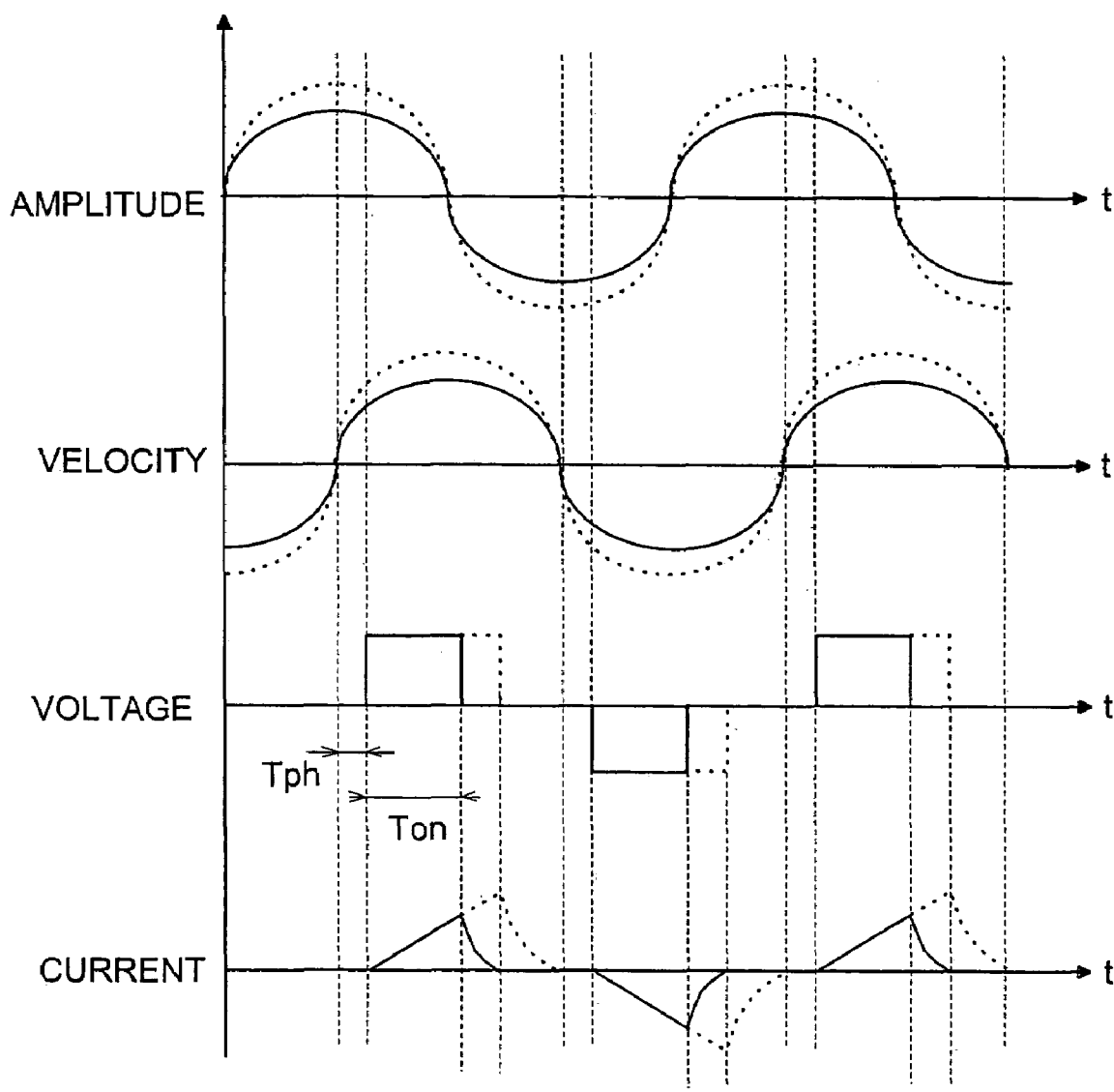
FIG. 24 is a time chart showing a current waveform of the prior art.

FIG. 23A shows a time chart of the control signals S1 to S4 for forming the sawtooth current waveform of FIG. 6 with the use of the alternating voltage output part 61 of FIG. 22A or 22D. FIG. 23B shows a time chart of the control signal S1 for forming the sawtooth current waveform of FIG. 6 with the use of the alternating voltage output part 61 of FIG. 22B or 22E.

Although each of the ON-time and the OFF-time of the voltage is controlled in order to form the intended current waveform in this embodiment, in the actual real time control, it can be difficult to perform complicated control at every half-cycle or one cycle of the moving element 1 due to a constraint of the control device, such as CPU speed, ROM capacity, etc. So, the controller may control a ratio of the ON-time (T1) to the OFF-time (T2), namely a duty ratio (T1/T2), while keeping the sum of the ON-time and the OFF-time (T3=T1+T2) constant. That is, the controller may use a so-called PWM control method. In this case, the controller 6 can form an intended current waveform without using a complex control system.

Or, the controller 6 may use a so-called PFM control method. That is, the controller may control the sum time (T3) while keeping the duty ratio (T1/T2) constant.

Or, the controller 6 may control both the sum time (T3) of the ON-time and the OFF-time and the duty ratio (T1/T2). Or, the controller 6 may use both the PWM control method and the PFM control method as the situation demands.

As mentioned above, as many apparently widely different embodiments of this invention may be made without departing from the spirit and scope thereof, it is to be understood that the invention is not limited to the specific embodiments thereof except as defined in the appended claims.

The invention claimed is:

1. A driving unit comprising:
   a moving element;
   an elastic body configured to support said moving element, said elastic body and said moving element constituting a resonance system in which kinetic energy of said moving element and elastic energy of said elastic body are conserved and converted to each other;
   a permanent magnet fixed on said moving element;
   an electromagnet disposed opposite to said permanent magnet, said electromagnet including a magnetic material and a coil wound around said magnetic material;
   a controller, said controller magnetizing said magnetic material by feeding a current through said coil, and giving a vibration force to said moving element by magnetic force acting between said magnetic material and said permanent magnet;
   wherein
   said controller comprises a current waveform decider and an alternating voltage output part,
   said current waveform decider calculating vibration force necessary for an intended motion of the moving element based on behavior of the moving element and determining a sawtooth current waveform to be fed through the coil so as to give the calculated vibration force to the moving element,
   said alternating voltage output part applying a voltage to said coil intermittently at intervals shorter than an application time of said sawtooth current waveform so that a current in a form of said sawtooth current waveform flows through said coil.

2. The driving unit as set forth in claim 1, wherein
   said sawtooth current flows through said coil during a predetermined application time after a lapse of a certain period from a time point when said moving element passed the maximum amplitude point.

3. The driving unit as set forth in claim 1, wherein
   said current waveform decider determines the vibration force necessary for said moving element to reciprocate in a resonant condition based on the behavior of the moving element.

4. The driving unit as set forth in claim 1, wherein
   said current waveform decider predicts induced electromotive force in response to a velocity of the moving element and defines a relation between the current value to be given to the coil and the voltage value to be applied to the coil by said alternating voltage output part as a following equation 1;

$$i = \frac{(V_1 + E)}{R}\left(1 - e^{-\frac{R}{L}}\right) \cdot t \qquad \text{(equation. 1)}$$

where i represents a current value to be given to the coil, $V_1$ represents an alternating voltage to be applied to the coil, E represents a predicted induced electromotive force, R represents a resistive component of the coil, L represents an inductance of the coil and t represents elapsed time from application of the voltage.

5. The driving unit as set forth in claim 4, wherein said current waveform decider predicts the inductance of the coil in response to a position of the moving element and changing the inductance of the coil in the equation 1 in response to the position of the moving element.

6. The driving unit as set forth in claim 1, wherein said alternating voltage output part controls ON-time and OFF-time of the voltage to be applied to said coil in order to apply the voltage to said coil intermittently.

7. The driving unit as set forth in claim 1, wherein said alternating voltage output part controls a ratio of ON-time to OFF-time of the voltage to be applied to said coil in order to apply the voltage to said coil intermittently.

8. The driving unit as set forth in claim 1, wherein said alternating voltage output part controls a sum of ON-time and OFF-time of the voltage to be applied to said coil in order to apply the voltage to said coil intermittently.

9. The driving unit as set forth in claim 1, wherein said alternating voltage output part controls a sum of ON-time and OFF-time of the voltage applied to said coil and a ratio of the ON-time to the OFF-time of the voltage in order to apply the voltage to said coil intermittently.

10. The driving unit as set forth in claim 1, further comprising a sensor configured to detect a behavior of said moving element, said current waveform decider determining the vibration force necessary for an intended motion of the moving element based on the behavior of said moving element detected by said sensor.

11. A method for driving a driving unit, said driving unit comprising:

a moving element;

an elastic body configured to support said moving element, said elastic body and said moving element constituting a resonance system in which kinetic energy of said moving element and elastic energy of said elastic body are conserved and converted to each other;

a permanent magnet fixed on said moving element;

an electromagnet disposed to be opposed to said permanent magnet, said electromagnet including a magnetic material and a coil wounded around said magnetic material; and a controller, said controller magnetizing said magnetic material by feeding a current through said coil and giving a to said moving element by magnetic force acting between said magnetic material and said permanent magnet, said controller comprising a current waveform decider and an alternating voltage output part, said method comprising the steps of:

(a) calculating vibration force necessary for an intended motion of the moving element based on behavior of the moving element by said current waveform decider, (b) determining a sawtooth current waveform to be fed through the coil so as to give the vibration force calculated in the step (a) to the moving element by said current waveform decider, (c) applying a voltage to said coil intermittently at intervals shorter than an application time of said sawtooth current waveform so that a current in a form of said current waveform determined by said current waveform decider flows through said coil by said alternating voltage output part.

* * * * *